No. 857,162. PATENTED JUNE 18, 1907.
F. E. DAVIS.
CULTIVATOR.
APPLICATION FILED JAN. 18, 1904.

3 SHEETS—SHEET 1.

No. 857,162. PATENTED JUNE 18, 1907.
F. E. DAVIS.
CULTIVATOR.
APPLICATION FILED JAN. 18, 1904.

3 SHEETS—SHEET 2.

Witnesses:
Harry L. Clapp
Lillian Prentise

Inventor:
Frank E. Davis,
By Fred Gerlach
his Attorney.

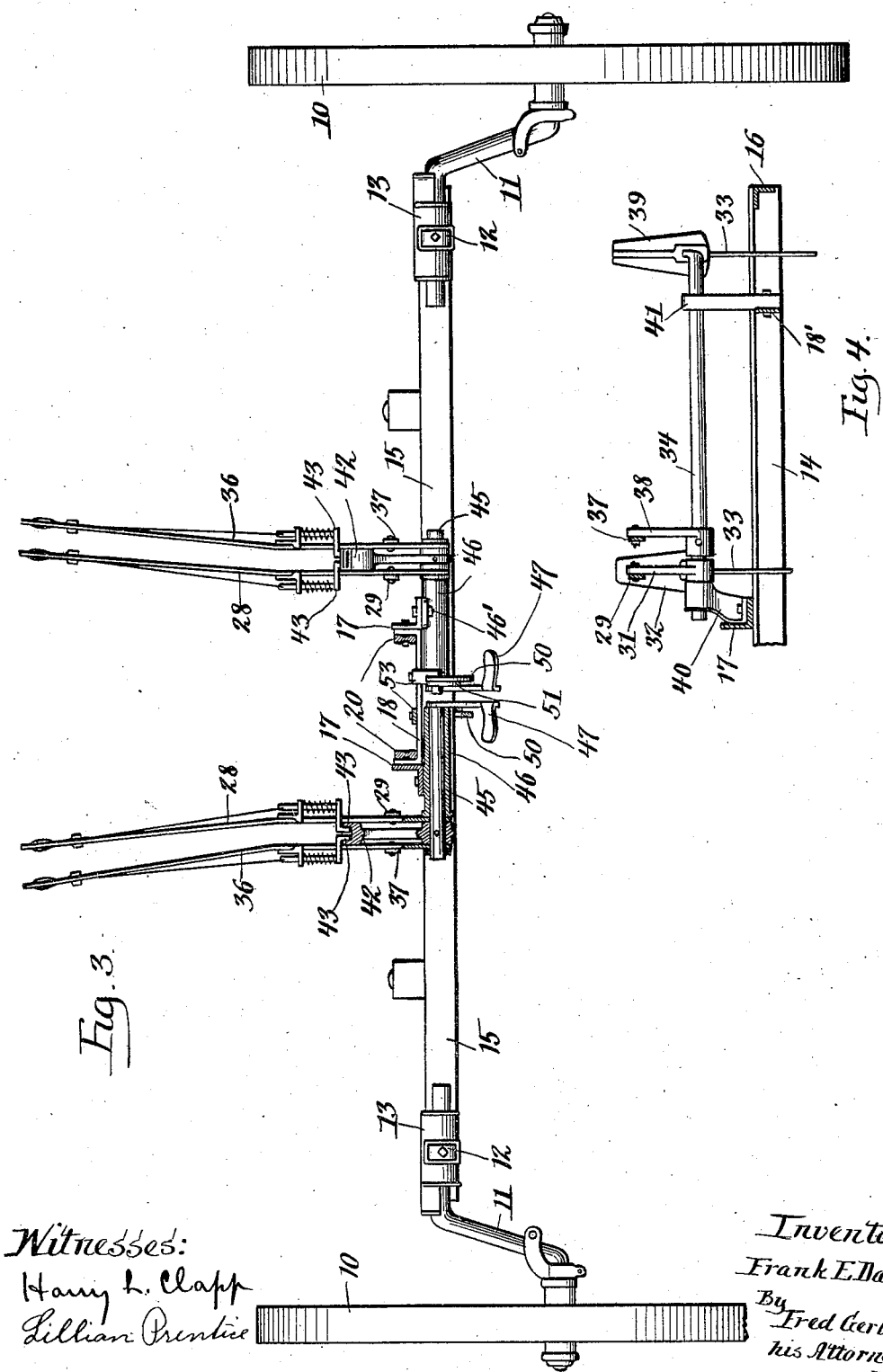

UNITED STATES PATENT OFFICE.

FRANK E. DAVIS, OF LA CROSSE, WISCONSIN.

CULTIVATOR.

No. 857,162.　　Specification of Letters Patent.　　Patented June 18, 1907.

Application filed January 18, 1904. Serial No. 189,496.

*To all whom it may concern:*

Be it known that I, FRANK E. DAVIS, a resident of the city of La Crosse, in the county of La Crosse and State of Wisconsin, have invented certain new and useful Improvements in Cultivators, of which the following is a full, clear, and exact description.

One object of the present invention is to provide a foot-lift for one or more of the shovel-supports or drag-bars, and whereby said beams or bars can be raised out of the ground and secured in elevated position.

The invention further designs to provide an improved spring-lift for a shovel-beam or beams.

A still further object of the invention is to provide a simple and improved construction of operating-mechanism for the shovel-beams by which a plurality of beams can be conjointly or individually shifted.

The invention also designs to provide improved operating means whereby the operator can lift the shovels either by his foot or by hand and whereby the shovels will be secured in elevated position.

Lastly the invention designs to provide an improved cultivator, in which the operating lever or levers for the drag-bars are located to the rear of the axle in convenient position for the operator without employing long levers.

The invention consists in the several novel features hereinafter set forth and more particularly defined by claim at the conclusion hereof.

Figure 1:
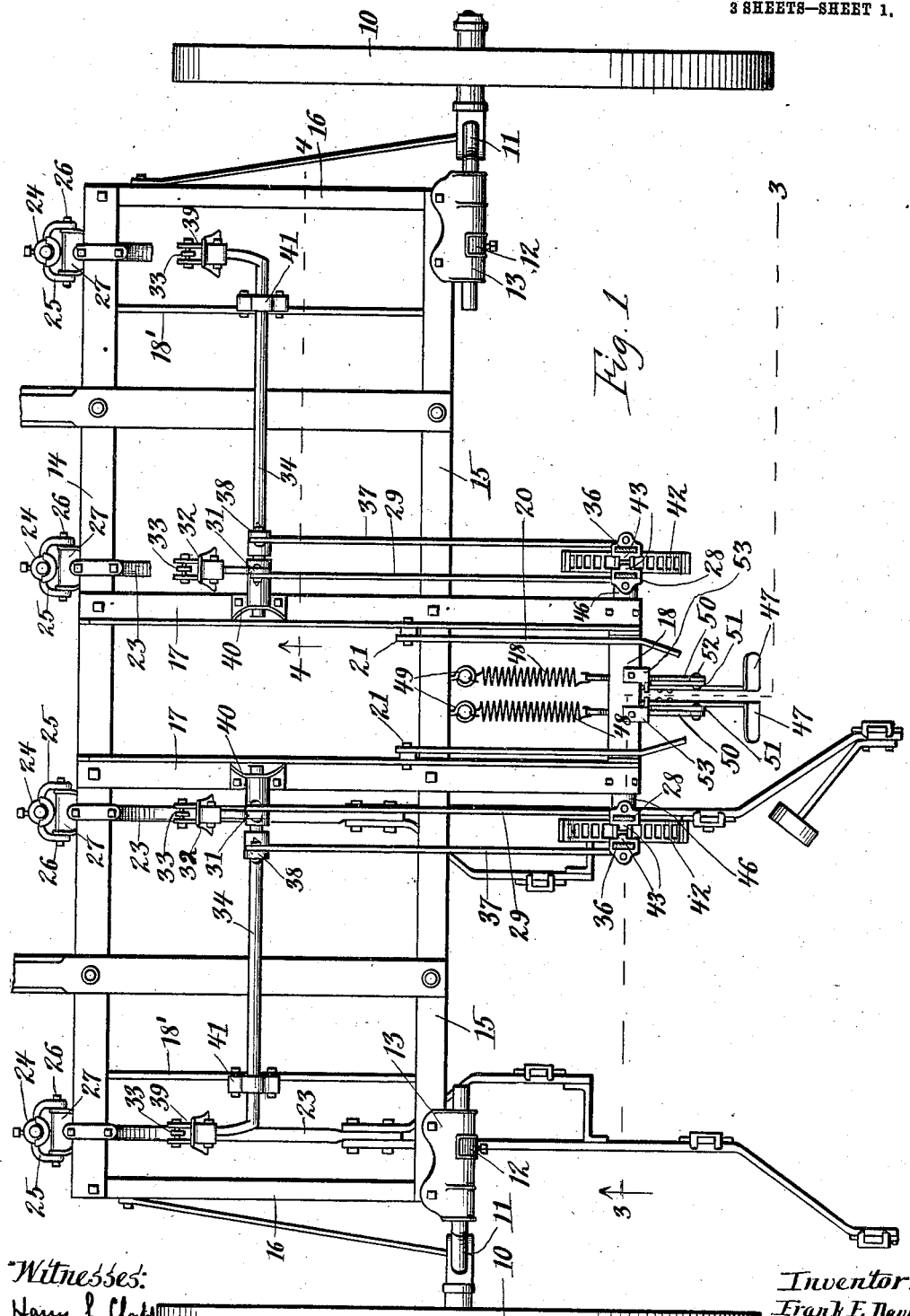
Figure 2:
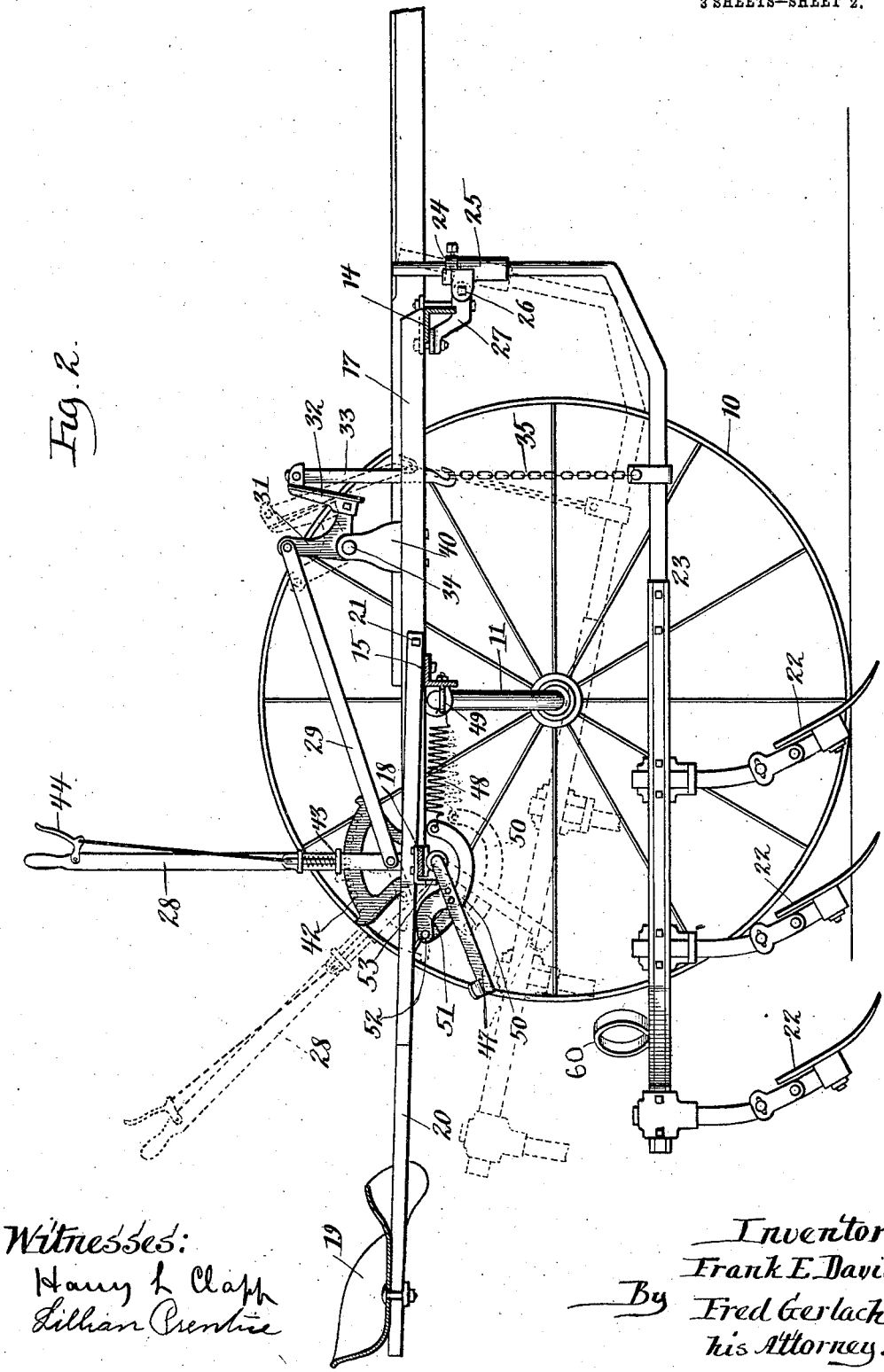

In the drawings: Figure 1 is a plan of a cultivator embodying the invention, one set of drag-bars being broken away. Fig. 2 is a central longitudinal section. Fig. 3 is a transverse section on line 3—3 of Fig. 1. Fig. 4 is a detail section taken on line 4—4 of Fig. 1.

The cultivator shown is of that type commonly known as a "two-row" cultivator, and comprises carrying-wheels 10, journaled on arch axles 11, having their upper terminals adjustably secured by collars 12 in brackets or socket-plates 13 whereto the frame is secured. The frame comprises, a front cross-bar 14, a rear cross-bar 15, side-bars 16, and a pair of longitudinal-bars 17 arranged near the center of the frame, and having their rear ends secured together by a cross-strip 18. An operator's seat 19, is sustained in proper relation by seat-bars 20 secured to bars 17 at 21.

The cultivator comprises a pair or set of shovel-gangs at each side, each pair being arranged to cultivate a row. The construction of the sets and operating-mechanism being similar, a description of one suffices for both. Each gang of shovels 22 is secured in suitable manner to a drag-bar or shovel-beam 23 having a front terminal swiveled and adjustably secured by a collar 24, in a sleeve 25, which is pivotally secured by a bolt 26 in a bracket 27 bolted to front-bar 14 of the frame. Such means sustain the drag-bars in manner free to be swung vertically and laterally as well understood in the art.

The mechanism for raising and lowering the inner drag-bar of a set, comprises a hand-lever 28, a connector 29, and a differential crank loosely mounted on a shaft 34, and having an arm 31 connected to the front end of connector 29 and an arm 32. The operating mechanism for the outer drag-bar of each set, comprises a hand-lever 36, a connector 37, an arm 38 rigidly secured to rock-shaft 34, and a differential-crank-arm 39 secured to the outer end of shaft 34. Crank-arms 32 and 39 are respectively and flexibly connected to the inner and outer drag-bars, by a suspension-bar 33 and a chain 35. Shaft 34 is journaled in a bracket 40 secured to frame-bar 18, and a bracket 41 secured to a frame-bar 18'.

Each of the hand-levers 28, 36 is held in assigned position with respect to a segmental-rack 42, by a spring-pressed locking-bolt 43 adapted to interlock with the teeth of said rack and connected to a finger-lever 44. Rack 42 is rigidly secured to a shaft 45 journaled in a bearing-sleeve 46 bolted to frame-bar 18 as at 46'. A foot-lever or treadle 47 is secured to the inner end of shaft 45, and thereby the shaft can be rocked to swing the rack. Hand-levers 28—36 are each pivotally sustained on shaft 45, and free to swing independently of said shaft and each other. A spring 48 has one of its ends secured to the frame as at 49, and its other end connected to a bent link 50 which is pivotally connected at 52 to an arm 51 of foot-lever 47. The relative arrangement of spring-hitch 49, shaft 45 which forms the lever-fulcrum, and pivot-connection 52 is such, that when the drag-bars are in working position the force of spring 48 will be applied to hold foot-lever 47 in elevated position (see full lines Fig. 2) and against a stop 53. These pivotal connections are arranged to cross the "dead-center" as the drag-bars are lowered and to relieve the shovel-beams of the force of the lift-spring while the shovels are in working position. As soon as the foot-lever is shifted beneath the "dead-center" the spring will become effective and apply its force to raise the drag-bars.

When the shovel-beams are in elevated or riding position differential crank-arms 32, 39 are positioned to apply the weight of the beams, near the vertical plane of shaft 34, and the force of spring 48 will then be sufficient to retain the shovel-beams and operating mechanism in assigned position.

The operation is as follows: Assuming the parts to be in position seen in dotted lines Fig. 2, the operator can conjointly lower the shovel-gangs of a set, by moving (without releasing the lock) either of the hand-levers 28, 36, forwardly. Such forward shift will swing rack 42 forwardly and simultaneously shift both of the drag-bar connections, and also shift foot-lever 47 into position seen in full lines Fig. 2. Spring 48 will then hold the foot-lever against stop 53, and hold the operating mechanism in assigned position. If relative adjustment of the shovel-gangs is desired, or if independent shift of either gang is desired, the operator can effect independent adjustment or shift by releasing the corresponding hand-lever from rack 42, which will disconnect the shovel-gang from the spring-held rack. The gangs of a set can be quickly and conjointly lifted by depression of the foot-lever, which will swing the rack and shift both of the drag-bar connections and elevate both gangs of a set, or the gangs can be conjointly lifted by rearward shift of either of the hand-levers, or if the shovels are working in hard soil, the operator can use both the foot-lever and one of the hand levers simultaneously.

The invention possesses several important advantages. The improved foot-lift makes it possible to conveniently lift the shovel-gangs into secured elevated position without use of the operator's hands. The gangs can be raised either by hand or foot or the hand-lever can be used conjointly with the foot-lever. By employing a single rack for both hand-levers, the levers are brought into close relation so the operator can readily determine the relative position of the shovel-gangs, from the relative position of the hand-levers, and this construction is one which can be produced at a low cost. Furthermore such close relation brings both hand-levers within convenient reach of the operator.

It will be observed that levers 28, 36, 47 are fulcrumed at the rear end of supporting-bars 17 which project rearwardly beyond the axle, and in proximity to the driver's seat which is located so the driver can easily retain his feet in stirrups 60 secured to the drag-bars and guide and depress the shovels. This construction makes it possible to employ rather short levers which can be conveniently operated and have a range of travel in convenient reach of an operator at the rear of the cultivator.

While the invention is shown as embodied in a two-row cultivator, it is manifest that certain features can be employed to advantage in a single-row cultivator. The invention is not to be understood as restricted to the particular construction set forth, and the several features thereof may be severally adopted, and may be modified, without departing from the spirit and scope of the invention.

Having thus described the invention, what I claim as new and desire to secure by Letters Patent, is:

1. In a cultivator the combination of a frame, a drag-bar swiveled at its front end so that it can be swung laterally and vertically, a foot-lever, a connection between said foot-lever and said drag-bar, automatically operating means for holding the drag-bar in lifted position when shifted by the foot-lever and means whereby the drag-bar can be lowered when it has been raised by the foot-lever.

2. In a cultivator the combination of a frame, a drag bar swiveled at its front end so that it can be swung laterally and vertically, a foot-lever, a connection between said foot-lever and said drag-bar, a spring whereby the drag-bar will be held in lifted position when shifted by the foot-lever and means whereby the drag-bar can be lowered when it has been raised by the foot-lever.

3. In a cultivator the combination of a frame, a drag-bar swiveled at its front end so that it can be swung laterally and vertically, a foot-lever, a connection between said foot-lever and the drag-bar, a spring applied to lift the drag-bar when the foot-lever is operated, and to hold the foot-lever in position when the drag-bar is lowered and means whereby the drag-bar can be lowered and for restoring the foot-lever into operative position when the drag-bar is lowered.

4. In a cultivator, the combination of a frame, drag-bar swiveled at its front end so it can be swung laterally and vertically, a pivoted foot-lever for raising the drag-bar, a connection between said foot-lever and said drag-bar, a spring having an eccentric connection arranged to travel across the "dead center", to differentially apply the force of said spring so as to alternately hold the lever in either of its positions and means whereby the drag-bar can be lowered and for shifting the foot-lever into operative position.

5. In a cultivator, the combination of a frame, a drag-bar, a pivoted foot-lever for raising the drag-bar, a connection between said foot-lever and said drag-bar, a spring, a link connecting said spring and said lever, the link-connection being arranged with respect to the lever fulcrum, to travel across the "dead center" and differentially apply said spring to hold the lever in either of its alternative positions and means whereby the drag-bar can be lowered and for shifting the foot-lever into operative position.

6. In a cultivator, the combination of a frame, drag-bar swiveled at its front end so it can be swung laterally and vertically, a foot-lever, and an operative connection between said foot-lever and said drag-bar comprising a hand-lever having an adjustable connection with said foot-lever.

7. In a cultivator the combination of a frame, a drag-bar swiveled at its front end so that it can be swung laterally and vertically, a foot-lever, a hand-lever, both of said levers being operatively connected to the drag-bar, and automatically operating means whereby the drag-bar will be secured in lifted position when the drag-bar is shifted by either of said levers.

8. In a cultivator the combination of a frame, a drag-bar swiveled at its front end so that it can be swung laterally and vertically, a foot-lever, a hand-lever, both of said levers being operatively connected to the drag-bar, and a spring whereby the drag-bar will be secured in lifted position when the drag-bar is shifted by either of said levers.

9. In a cultivator, the combination of a frame, drag-bar swiveled at its front end so it can be swung laterally and vertically, a foot-lever, a hand-lever, both of said levers being operatively connected to said drag-bar, and a spring alternately applied, to lift said drag-bar when said drag-bar is raised by either of said levers, and to hold said levers in position when the drag-bar is in its lowered position.

10. In a cultivator, the combination of a frame, drag-bar swiveled at its front end so it can be swung laterally and vertically, a foot-lever, a rack shiftable by said foot-lever, a hand-lever adjustably secured to said rack, and a connection between said hand-lever and said drag-bar.

11. In a cultivator, the combination of a frame, drag-bar swiveled at its front end so it can be swung laterally and vertically, a foot-lever, a rack shiftable by said foot-lever, a hand-lever adjustably secured to said rack, a connection between said hand-lever and said drag-bar, and means holding the connection in position to retain the drag-bar in raised position.

12. In a cultivator, the combination of a frame, drag-bar swiveled at its front end so it can be swung laterally and vertically, a foot-lever, a rack shiftable by said foot-lever, a hand-lever adjustably secured to said rack, a connection between said hand-lever and said drag-bar, and a spring applied to lift said drag-bar.

13. In a cultivator, the combination of a frame, a drag-bar swiveled at its front end so it can be swung laterally and vertically, a foot-lever, a rack shiftable by said foot-lever, a hand-lever adjustably secured to said rack, a connection between said hand-lever and said drag-bar, and a spring applied to alternately lift said drag-bar and to hold said rack and levers when the drag-bar is in lowered position.

14. In a cultivator, the combination of a frame, a pair of shovel-beams, a rack, and two hand-levers, each connected to one of said beams, and each of which is interlocked with said rack, said rack being movably sustained so shift thereof will effect conjoint shift of both of said beams.

15. In a cultivator, the combination of a frame, a pair of shovel-beams, a rack, two hand-levers, each connected to one of said beams, and each of which is interlocked with said rack, said rack being movably sustained so shift thereof will effect conjoint shift of both of said beams, and means securing said rack to support the beams in either raised or lowered positions.

16. In a cultivator, the combination of a frame, a pair of shovel-beams, a rack, two hand-levers, each connected to one of said beams, and each of which is interlocked with said rack, said rack being movably sustained so shift thereof will effect conjoint shift of both of said beams, and a spring alternately applied to shift said rack to lift the beams, and to hold said rack in position when the beams are in working position.

17. In a cultivator, the combination of a frame, a pair of shovel-beams, a foot-lever, a connection whereby said foot-lever can effect conjoint lift of both of said beams, said connections being adjustable to permit independent shift of the beams.

18. In a cultivator, the combination of a frame, a pair of shovel-beams, two hand-levers, each having a connection with one of said beams, and a foot-lever having connection with both of said hand-levers, and whereby conjoint shift of both of said hand-levers can be effected.

19. In a cultivator, the combination of a frame, a pair of shovel beams, two hand-levers, each having a connection with one of said beams, locking-means for each of said levers, and a foot-lever having connection with both of said hand-levers and whereby conjoint shift of both of said hand-levers can be effected.

20. In a cultivator, the combination of a frame, a pair of shovel-beams, two hand-levers, each having a connection with one of said beams, a foot-lever having connection with both of said hand-levers, and whereby conjoint shift of both of said hand-levers can be effected, and a spring applied to conjointly lift both of the beams.

21. In a cultivator, the combination of a frame, a pair of shovel-beams, two hand-levers each having a connection with one of said beams, a movably sustained rack wherewith both of said hand-levers are interlocked, and a foot-lever shifting said rack and whereby conjoint shift of both beams can be effected.

22. In a cultivator, the combination of a frame, a pair of shovel-beams, two hand-levers, each having a connection with one of said beams, a movably sustained rack wherewith both of said hand-levers are interlocked, a foot-lever for shifting said rack and whereby conjoint shift of both beams can be effected, and a spring applied to conjointly lift the beams.

23. In a cultivator, the combination of a frame, a pair of shovel-beams, two hand-levers, each having a connection with one of said beams, a pivotally sustained rack wherewith both of said hand-levers are interlocked, a foot-lever for shifting said rack and whereby conjoint shift of both beams can be effected, and a spring applied to alternately lift the beams, and secure said rack and its connections in position when the beams are in working position.

24. In a cultivator the combination of a frame, carrying wheels, a drag-bar swiveled at its front to swing laterally and vertically, a lever-support extending rearwardly of the axle, a foot-lever pivoted in the rear of the axle and sustained by said support in convenient position with respect to the operator's seat, a suspension device located forwardly of the axle, and a connection between the lever and the suspension device.

25. In a cultivator the combination of a frame, carrying-wheels, a drag-bar pivoted at its front to swing laterally and vertically one or more bars extending longitudinally of the frame, and near the center of the frame and extended rearwardly of the wheel-axle, a hand-lever pivoted in the rear of the axle and sustained by said bars in convenient position with respect to the operator's seat, locking means for the lever a suspension device arranged forwardly of the wheel-axle and connected to the drag-bar near the front end thereof, and a connection between the suspension device, and the hand-lever.

26. In a cultivator the combination of a frame, carrying-wheels, a drag-bar swiveled at its front to swing laterally and vertically, a lever-support extending rearwardly of the axle, a hand-lever sustained by said support in the rear of the axle and in convenient position with respect to the operator's seat, and an operative connection between the drag-bar and the lever comprising a crank arranged in front of the axle and connected to said lever, and a suspension device connected to the crank and to the drag-bar.

27. In a cultivator the combination of a frame, a pair of drag-bars, two hand-levers, a connection between one of the levers and one of the drag-bars, comprising a pivotally sustained cross-shaft having a crank connected with the drag-bar carried thereby, and a connection between the other lever and the other drag-bar, comprising a crank pivotally sustained by said rod, and connected with the drag-bar carried thereby.

28. In a cultivator, the combination with a frame, a pair of drag-bars, two hand levers, a connection between one of the levers and one of said drag-bars, comprising a cross-shaft having a crank connection with the drag-bar carried thereby, and a bar connecting said shaft and said lever, and a connection between the other hand-lever and the other drag-bar, comprising a crank pivotally sustained by said cross-shaft, and a bar connecting said other lever and said crank.

29. In a cultivator the combination of a frame, carrying-wheels, a drag-bar swiveled at its front so it can be raised and lowered and moved laterally, a foot-lever arranged rearwardly of the wheel-axle, a hand-lever pivoted rearwardly of the wheel-axle, supporting-means for said levers, an operative connection whereby the drag-bar can be lifted by either of said levers means for holding the levers in position to cause them to hold the drag-bar in lifted position.

30. In a cultivator the combination of a frame, carrying-wheels, a drag-bar swiveled at its front so it can be raised and lowered or moved laterally, said frame comprising a support extending rearwardly of the axle, a foot-lever pivoted in the rear of the axle and sustained by said support in convenient position with respect to the operator's seat, and an operative connection between said lever and the drag-bar whereby the drag-bar can be lifted, said connection comprising a hand-lever and a suspension device arranged in front of the axle.

31. In a cultivator the combination of a frame, carrying-wheels, a pair of drag-bars each swiveled at its front so it can be swung vertically or laterally, said frame comprising a support extended rearwardly of the wheel-axle, a hand-lever for each drag-bar, a connection between each of the hand-levers and one of the drag-bars, and a foot-lever pivotally sustained in the rear of the axle in convenient position with respect to the operator's seat and connected to both of said hand-levers and whereby both of the drag-bars can be operated.

FRANK E. DAVIS.

Witnesses:
C. W. DICKINSON,
J. F. CROSS.